(12) United States Patent
Christiansen

(10) Patent No.: US 8,438,745 B2
(45) Date of Patent: *May 14, 2013

(54) PASS/FAIL TAPE MEASURE CALIBRATOR

(75) Inventor: Douglas J. Christiansen, Lindon, UT (US)

(73) Assignee: Douglas J. Christiansen, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/212,533

(22) Filed: Aug. 18, 2011

(65) Prior Publication Data

US 2013/0042491 A1    Feb. 21, 2013

(51) Int. Cl.
*G01B 3/10* (2006.01)

(52) U.S. Cl.
USPC ............... 33/502; 33/770; 33/759; 33/567; 33/494

(58) Field of Classification Search ........... 33/502, 33/755, 757–760
See application file for complete search history.

(56) References Cited

U.S. PATENT DOCUMENTS

| | | | | |
|---|---|---|---|---|
| 1,732,906 A * | 10/1929 | Morton | ............... | 33/490 |
| 3,362,075 A * | 1/1968 | Quenot | ............... | 33/770 |
| 4,033,041 A * | 7/1977 | Allums | ............... | 33/759 |
| 4,930,227 A * | 6/1990 | Ketchpel | ............... | 33/755 |
| 5,430,952 A | 7/1995 | Betts | | |
| 5,435,074 A | 7/1995 | Holevas et al. | | |
| 6,052,914 A * | 4/2000 | Soon | ............... | 33/758 |
| 6,338,204 B1 | 1/2002 | Howle | | |
| 6,370,790 B1 * | 4/2002 | Stenger | ............... | 33/758 |
| 6,637,126 B2 * | 10/2003 | Balota | ............... | 33/770 |
| 6,880,260 B2 | 4/2005 | Baida | | |
| 7,299,565 B2 | 11/2007 | Marshall et al. | | |
| 7,627,958 B2 * | 12/2009 | Tallon et al. | ............... | 33/758 |
| 7,669,347 B1 * | 3/2010 | Huang | ............... | 33/758 |
| 8,024,867 B2 * | 9/2011 | Christiansen | ............... | 33/502 |
| 2003/0213141 A1 * | 11/2003 | Lin | ............... | 33/758 |
| 2010/0018068 A1 * | 1/2010 | Christiansen | ............... | 33/502 |

* cited by examiner

*Primary Examiner* — Yaritza Guadalupe-McCall
(74) *Attorney, Agent, or Firm* — R. Camden Robinson; Van Cott, Bagley, Cornwall & McCarthy P.C.

(57) ABSTRACT

A tape measure calibrator includes a base with a slot with a pull reference surface and a push reference surface, the slot being configured to receive an end hook of a tape measure. The base also includes a pull calibration band on the base with a centerline of the pull calibration band indicating a first distance from the pull reference surface. The base also includes a push calibration band on the base, a centerline of the push calibration band indicating a second distance from the push reference surface, n which the first distance and the second distance are substantially equal.

18 Claims, 10 Drawing Sheets

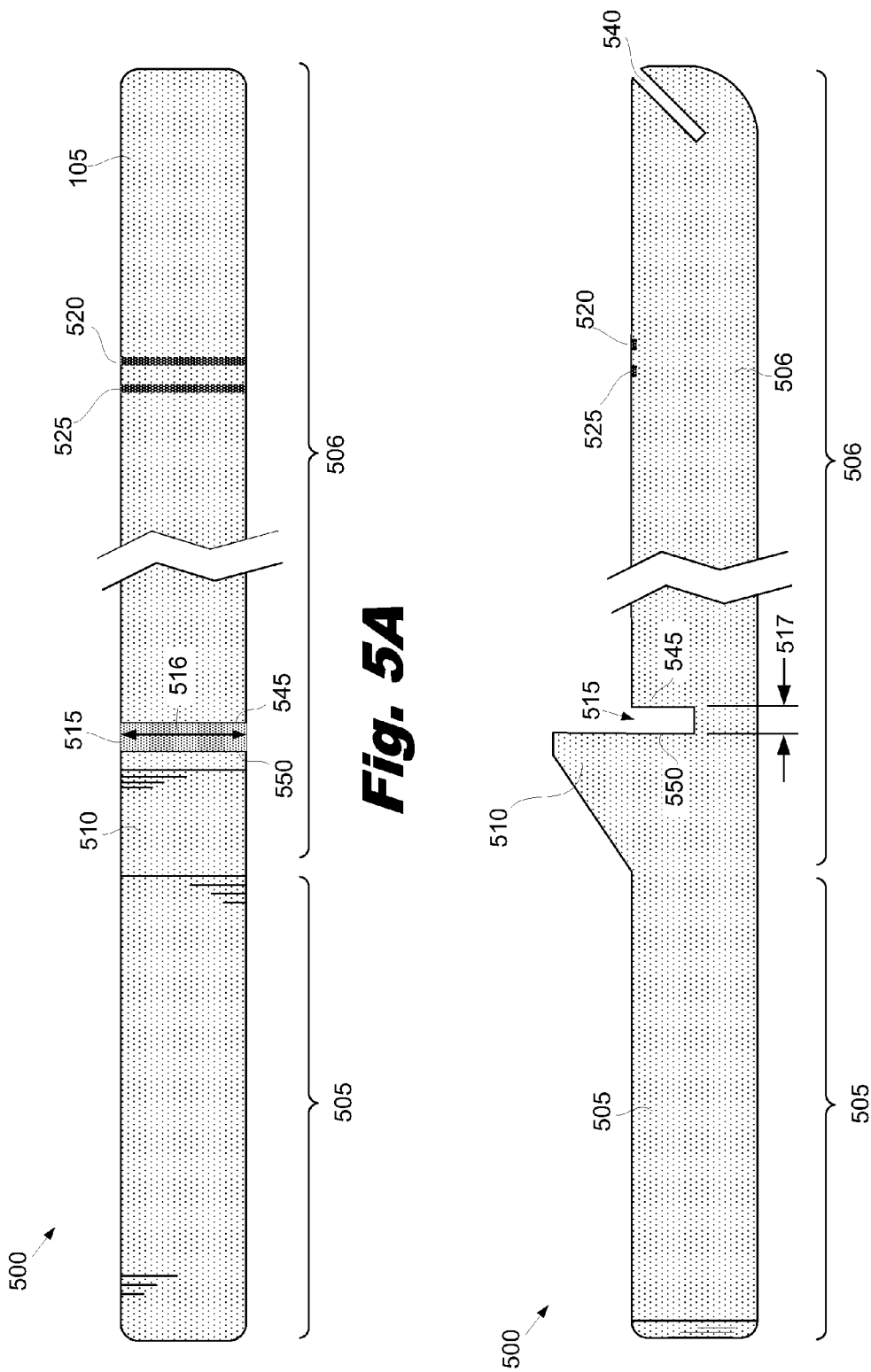

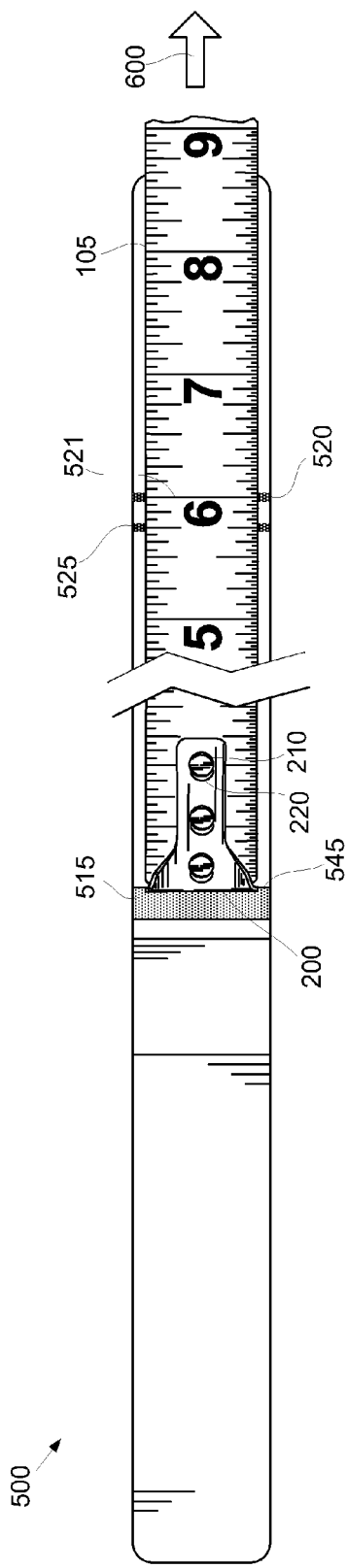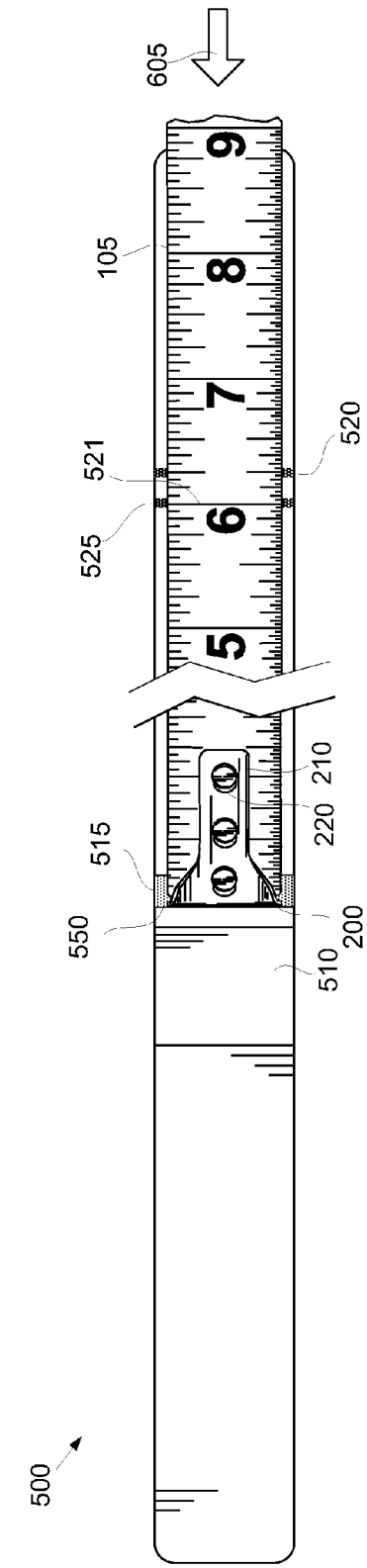

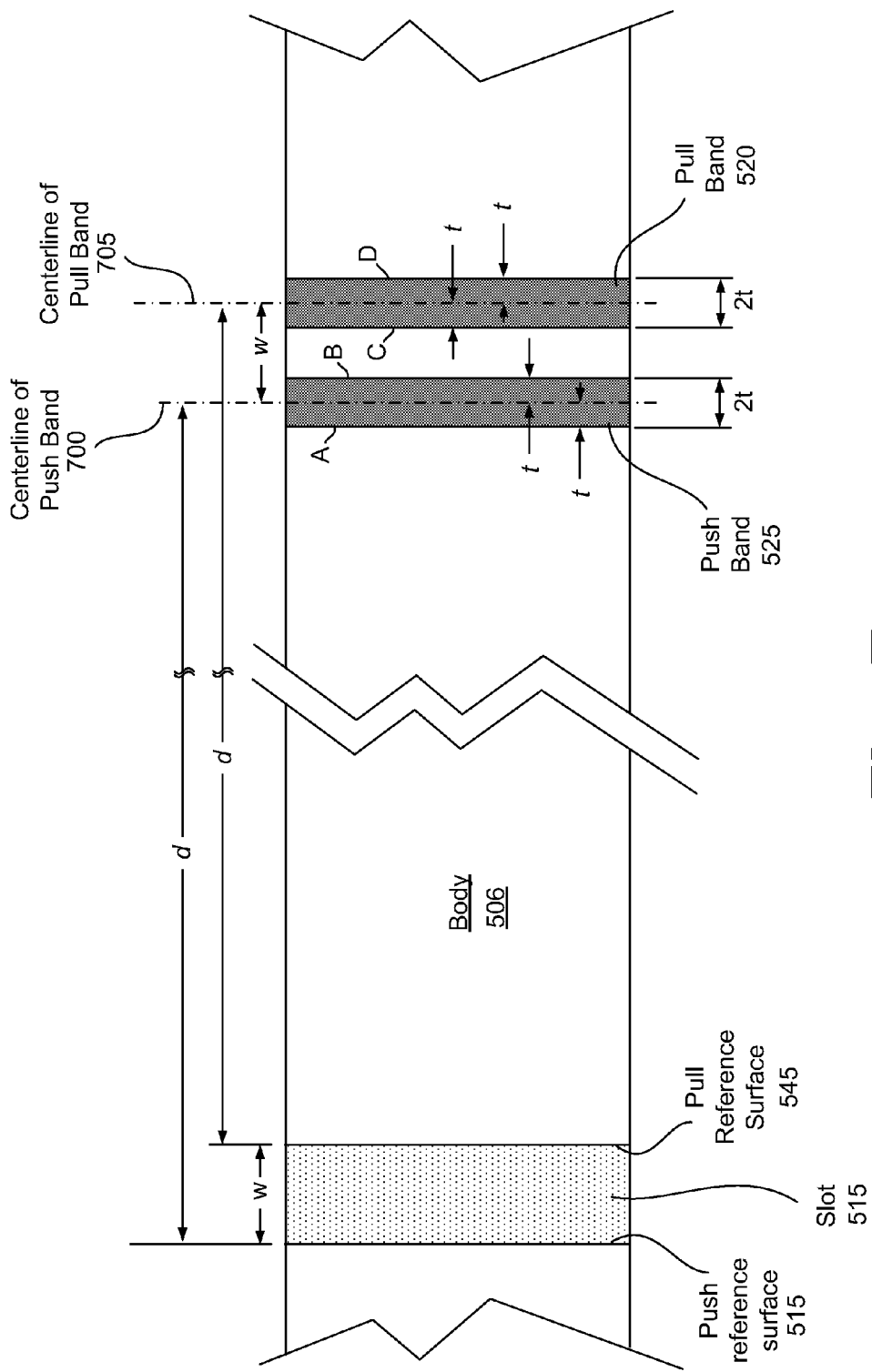

PASS/FAIL TAPE MEASURE CALIBRATOR

RELATED DOCUMENTS

The present application is a continuation-in-part and claims the benefit under 35 U.S.C. §120 of U.S. Patent Publication 20100018068, filed Jul. 17, 2009, which claims the benefit under 35 U.S.C. §119(e) of U.S. Provisional Application No. 61/082,829, filed Jul. 23, 2008, both of which are incorporated herein by reference in their entirety.

BACKGROUND

A tape measure is a flexible form of ruler. The tape measure consists of a ribbon of cloth, plastic, or metal with linear-measure markings, often in both imperial and metric units. Tape measures designed for carpentry or construction often use a stiff, curved metallic ribbon that can remain stiff and straight when extended, but retracts into a coil for convenient storage. A tape measure of 3 to 100 feet can wind into a relatively small housing. This type of tape measure will have a floating end hook to aid in measuring. The end hook consists of a tang and a hook. The tang is designed to float a distance equal to the hook's thickness, to provide both inside and outside measurements that are accurate.

In many instances, measurement accuracy is essential to creating a quality finished product. For example, in cabinet-making, a series of 1/16" errors in cutting 8 pieces could result an assembled cabinet which is ½" too large or ½" too small. The combined discrepancies add up to significant errors. A set of cabinets that are ½" too big won't fit the opening they were designed for, thus causing loss of time and money to modify or remake the cabinets.

The accuracy of tape measures is particularly important when several tape measures are being used by different people or at different locations. For example, a cabinetmaker makes a cabinet door, then orders glass to fit it using a tape measure. The glass company cuts glass for the same cabinet door using their tape measure. If one or the other has not used an accurate tape measure, the glass will not fit in the door as designed.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

FIGS. 5A and 5B show a top and a side view, respectively, of an illustrative pass/fail tape measure calibrator, according to one embodiment of principles described herein.

FIG. 6A shows an illustrative pass/fail tape measure calibrator making pull calibration, according to one embodiment of principles described herein.

FIG. 6B shows an illustrative pass/fail tape measure calibrator making push calibration, according to one embodiment of principles described herein.

FIG. 7 is a diagram showing the location and dimensions of a slot, a push band and a pull band of a pass/fail tape measure calibrator, according to one embodiment of principles described herein.

Throughout the drawings, identical reference numbers designate similar, but not necessarily identical, elements.

DETAILED DESCRIPTION

Accuracy is the degree of conformity of a measured or calculated quantity to its true value. Precision or repeatability is the degree to which a number of measurements or calculations show the same or similar results. The results of a measurement can be accurate but not precise, precise but not accurate; neither; or both. The measurement is valid if it is both accurate and precise.

To determine if a measuring device makes valid measurements, a standard with a known dimension can be used. The measuring device is used to measure the standard and the resulting measurement compared to the known dimension of the standard. If the measurement produced by the measurement device is substantially equivalent to the known dimension and the measurement is repeatable, it can be assumed that measurement device is calibrated to make valid measurements of that particular dimension.

In one of many possible embodiments, the present illustrative apparatus provides pass/fail calibrations of a tape measure making both push and pull measurements. If the tape measure passes both the push and the pull calibrations, it can be certified that the tape measure makes measurements that are accurate within a specified tolerance. If the tape measure fails either the push or the pull calibration, the tape measure fails the calibration corrective action should be taken.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Figure 1:
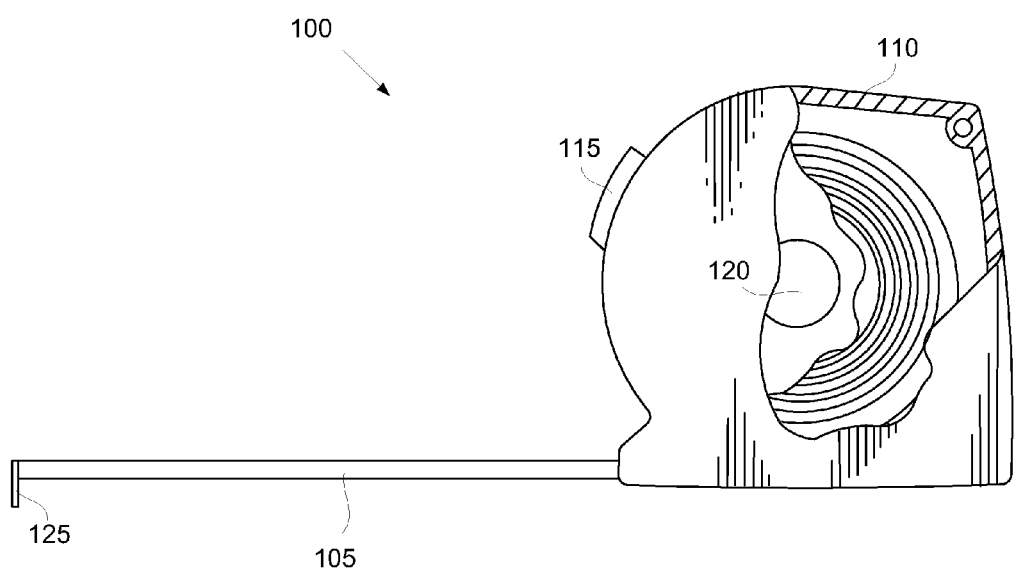
FIG. 1 is a partially cut away view of an illustrative tape measure, according to one embodiment of principles described herein.

FIG. 1 is a partially cutaway side view of one embodiment of a tape measure (100). The tape measure (100) is comprised of a flexible tape (105), which is configured to be retracted and extended from a housing (110). According to one illustrative embodiment, the flexible tape has a concave cross section and linear graduations along its length. In its stowed position, the flexible tape is coiled around a reel (120) within the housing (110). The flexible tape (105) terminates with an end hook (125). The end hook (125) is used to contact an edge or surface, which serves as a reference plane during a measurement. A lock (115) can be depressed to prevent the retraction or extension of the flexible tape (105) from the housing (110).

Figure 2A:
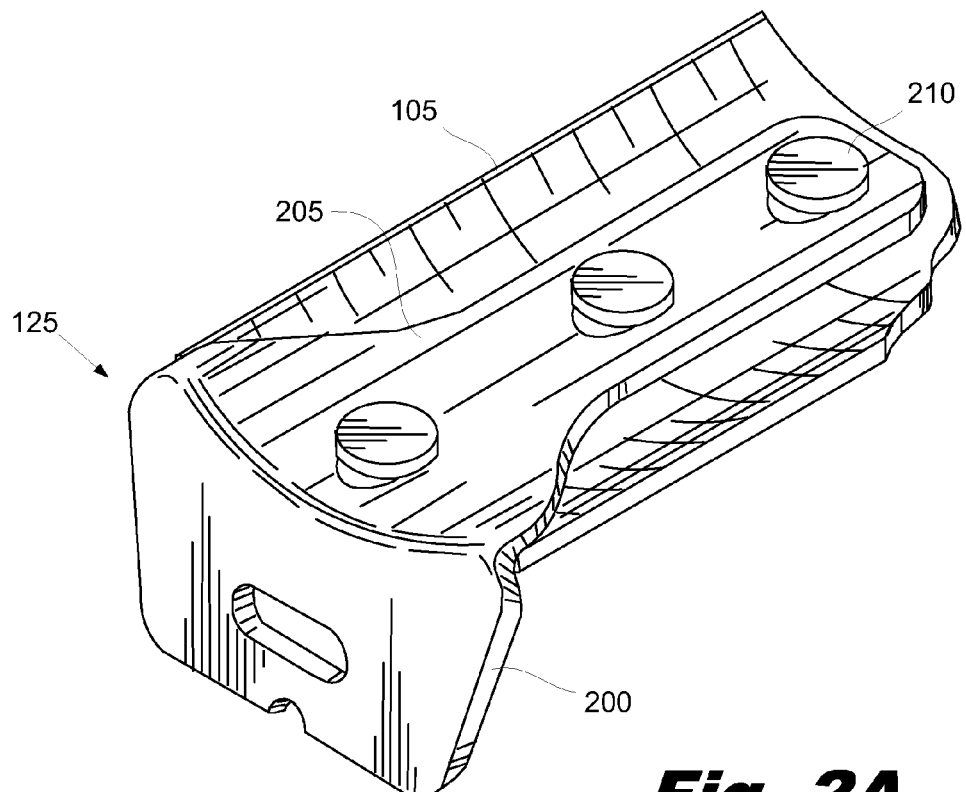
FIGS. 2A and 2B illustrate a perspective view and a top view, respectively, of an illustrative tape measure end hook, according to one embodiment of principles described herein.
Figure 2B:
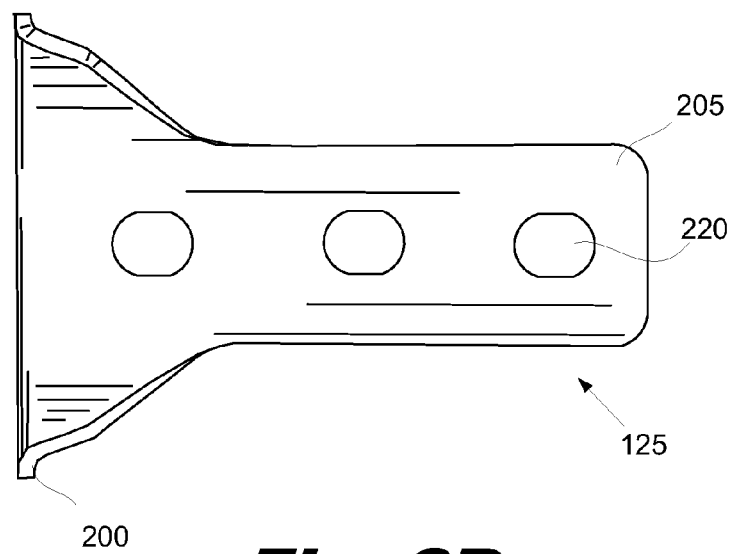

FIGS. 2A and 2B illustrate a perspective view and a top view of a tape measure end hook (125) and the tang of the end hook (205). According to one exemplary embodiment, the tape measure end hook (125) has a tang (205) that extends axially along the flexible tape (105) and a hook (200), which extends perpendicularly from the tang (205) and overlies the outer edge of the flexible tape (105). A number of rivets (210) pass through elongated holes in the tang (205) of the end hook (125) and slidably fasten the end hook (125) to the flexible tape (105). As used in the specification and appended claims the term "slidably" refers to a loose attachment that allows precision linear movement. FIG. 2B shows a top view of the tape measure end hook (125), which shows the elongated holes (220) through which the rivets (210) pass.

Figure 3A:
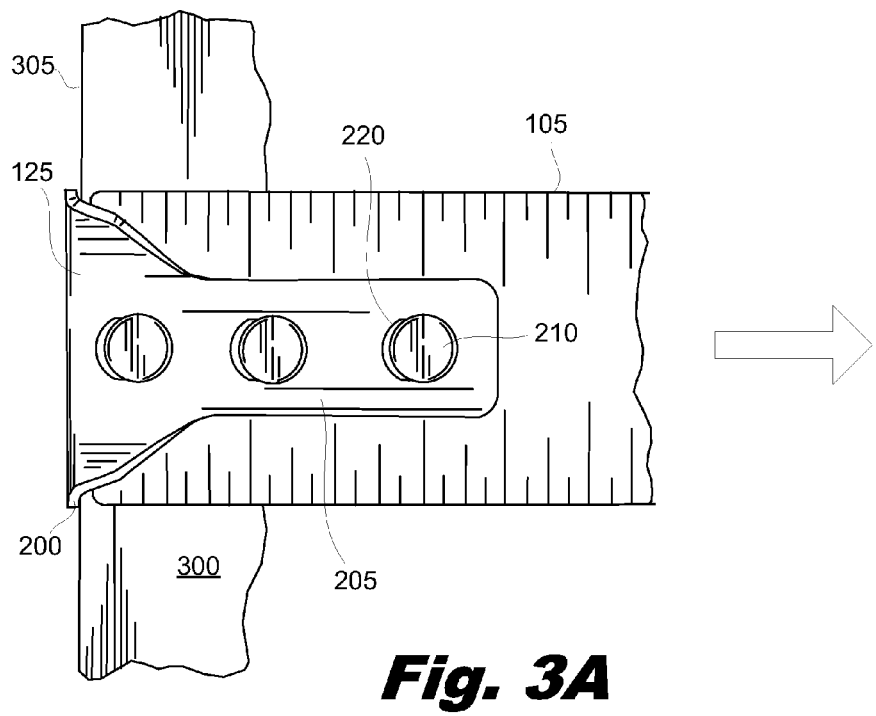
FIGS. 3A and 3B illustrate a top and a side view, respectively, of an illustrative tape measure making a pull measurement, according to one embodiment of principles described herein.
Figure 3B:
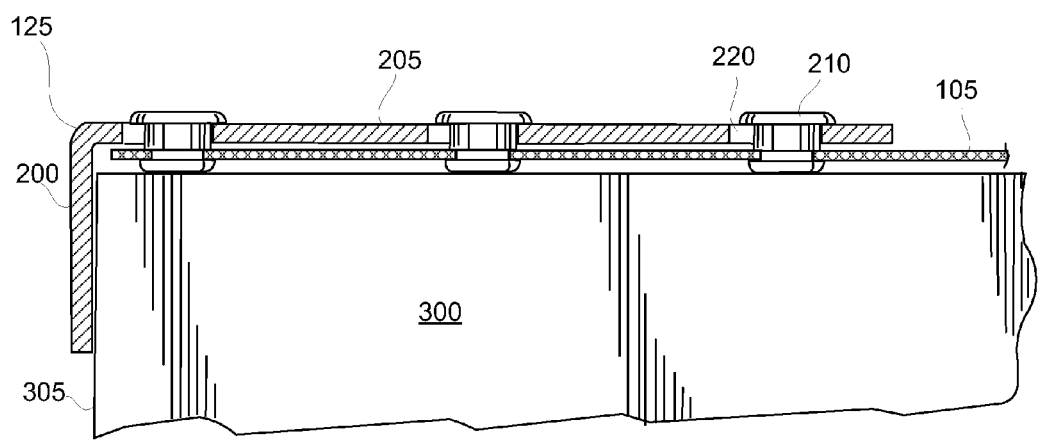

FIGS. 3A and 3B illustrate a top and a partially cut-away side view, respectively, of a tape measure making a pull measurement. In a pull measurement, the end hook (125) is placed over the edge of a block (300). The inner surface of the hook (200) contacts a reference surface (305) of a block (300). The flexible tape (105) is pulled axially away from the reference surface to ensure that the hook (200) firmly contacts the reference surface. The rivets (210) slide within the elongated holes (220) in the tang (205) until the rivets (210) contact a first end of the elongated holes. The end hook (125) is then fully extended with respect to the flexible tape (105). In this position, the tape measure (100) is designed to make a pull measurement from the reference plane (305) to any point along the flexible tape (105).

Figure 4A:
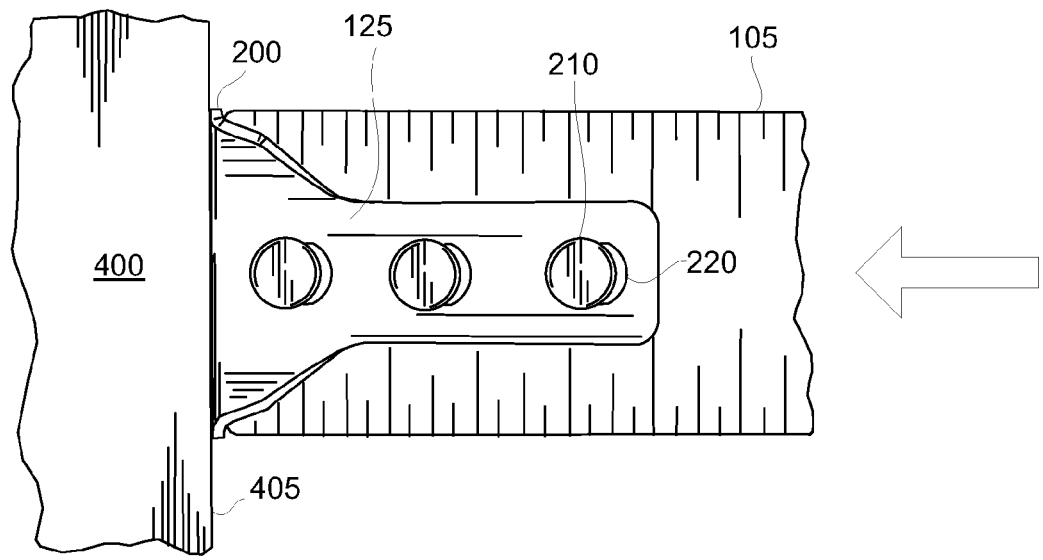
FIGS. 4A and 4B illustrate a top and a side view, respectively, of an illustrative tape measure making a push measurement, according to one embodiment of principles described herein.
Figure 4B:
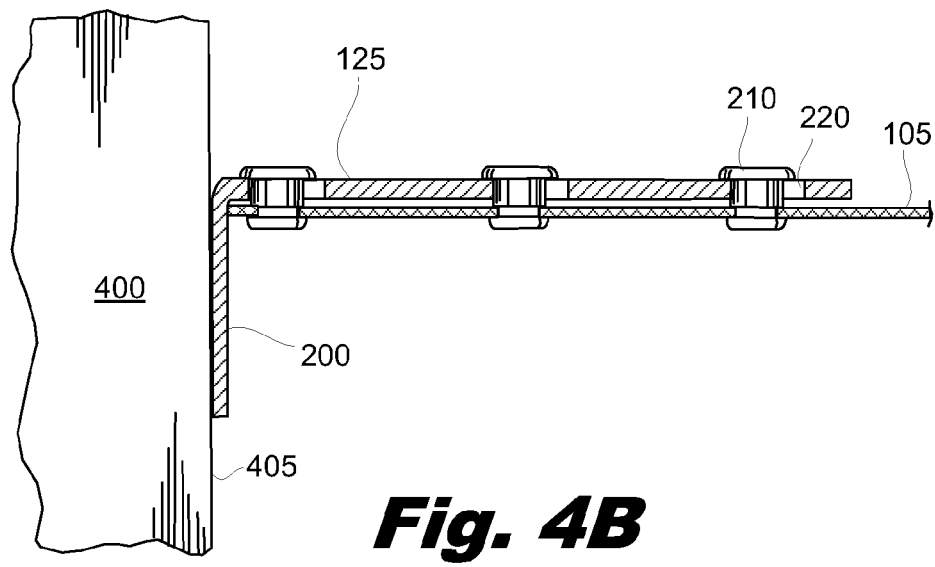

FIGS. 4A and 4B illustrate a top and a side view, respectively, of a tape measure making a push measurement. In a push measurement, the outside of the hook (200) is pushed against a reference surface (405) of an object (400). The flexible tape (105) and attached rivets (210) slide in the elongated holes (220) until the rivets contact a second end of the elongated holes. The end hook (125) is then fully retracted with respect to the flexible tape (105). In this configuration, the tape measure (100) is designed to precisely make a push measurement from the reference plane (405) to any point along the flexible tape (105). Typically a small amount of compressive force is maintained during a push measurement to ensure that the outer surface of the hook (200) remains in contact with reference surface (405) and that the rivets remain firmly engaged with the second end of the elongated holes (220).

Ideally, the elongated holes (220) allow for the tang (205) to slide a distance that is equivalent to the thickness of the hook (200). In this way, both push and pull measurements are precise. In a pull measurement, the tang (205) slides parallel away from the flexible tape (105) a distance equivalent to the thickness of the hook (200) by means of loose rivets (210) and elongated holes (220) in the tang (205). Thus, the measured distance is the length of the tape (105) adjusted by the sliding of the tang to compensate for the thickness of the hook (200). In a push measurement, the flexible tape (105) slides toward the hook a distance equivalent to the thickness of the hook (200). Therefore, the measured distance is still the length of the tape (105) adjusted by the sliding of the tang to compensate for thickness of the hook (200). Ideally, the tape measure is calibrated to give a valid measurement at any point along the flexible tape in both the pull and push configurations.

However, a variety of factors could contribute to mechanical inaccuracies in tape measure readings. For example, the hook (200) may become distorted or bent. By way of example and not limitation, the hook (200) dimensions may become bent by repeated impact with the housing as the tape is recoiled, by impact with other tools, or when the tape measure is dropped. In situations where accuracy and precision of the tape measure are desired, such as precision woodworking, an inaccurate tape measure can cause significant problems. Where two carpenters are working cooperatively to complete a project using their individual tape measures, the tape measures should be calibrated to reduce measurement errors. For example, a first carpenter may measure an opening for crown molding using a push measurement using a first tape measure. The first carpenter communicates the result of the push measurement to the second carpenter who uses a second tape measure to make a pull measurement across the length of the molding, which is to be cut and installed in the opening. If either of the measured values is invalid, the desired fit of the molding will not be achieved. However, if both tape measures are correctly calibrated for both push and pull measurements, then both of the measurements will be valid. The communication of measurements between the two carpenters will be effective and achieve the desired result.

FIGS. 5A and 5B illustrate a top and a side view, respectively, of an illustrative pass/fail tape measure calibrator (500). According to one illustrative embodiment, the tape measure calibrator (500) comprises a generally rectangular body, with the length of the calibrator (500) being larger than the height or the width. The tape measure calibrator (500) includes a handle portion (505) and a base portion (506). The handle (505) provides a gripping surface while the base (506) contains features which allow the calibration of a tape measure. The handle (505) is optional. For example, where the pass/fail tape measure calibrator (500) is permanently mounted or grasped in a different way, the handle (505) may be omitted.

The base (506) of the calibrator (500) includes a stop (510), a hook slot (515) having a pull reference surface (545) and a push reference surface (550), a push calibration band (525) and a pull calibration band (520). The hook slot (515) has a length (516) and a width (517). The length (516) and width (517) of the hook slot (515) are designed to accommodate the majority of end hook designs. The end hook designs may vary from manufacturer to manufacturer and from measuring tape to measuring tape. According to one illustrative embodiment, the length (516) of the hook slot (515) is sufficiently large so that the hook portion of the end hook can fit entirely within the slot. The width (517) of the hook slot (515) is wider than that thickness of the hooks of most end hooks so that the end hooks may be easily inserted into the slot.

The distance between a center of the pull calibration band (520) and the pull reference surface (545) of the slot (515) is equal to the distance between the center of the push calibration band (525) and a push reference surface (550) of the hook slot (515). According to one illustrative embodiment, the distance between the centerline of the pull calibration band (520) and the center line of the push calibration band (525) is substantially equal to the width of the hook slot (515).

Although only two calibration bands are shown, the calibrator may also have any number of additional calibration bands which provide for calibration at other distances. For example, other calibration bands may be included to allow convenient calibration of a metric tape measure.

FIG. 6A illustrates a top view of the pass/fail tape calibrator (500) making pull calibration. The hook (200) of tape measure (100) is inserted into the hook slot (515). The tape (105) is then pulled to the right as indicated by the arrow (600). As described above with reference to making a pull measurement, the rivets (210) attached to the flexible tape (105) slide in the elongated holes (220) until the rivets (210) contact the end of the elongated holes (220). The inner surface of the hook (200) is pulled against the pull reference surface (545). This is the measurement position for a pull measurement. The linear graduations on the tape (105) are then compared to a pull calibration band (520). In this case, the tape calibrator (500) is configured such that there is a distance of six inches between the pull reference surface (545) and the centerline of the pull calibration band (520). The pull calibration band (520) is compared to the corresponding mark (521) on the tape. If the mark (521) on the tape falls within the pull calibration band (520), the tape is within the specified tolerance. In the example shown in FIG. 6A, the tape measurement is the six inch mark (521), the tape measure is correctly calibrated for a pull measurement of six inches.

FIG. 6B illustrates a top view of pass/fail tape calibrator (500) making push calibration. To make the corresponding push calibration, the tape (105) is then pushed to the left as indicated by the arrow (605). The outer surface of the hook (200) is pushed into contact with the push reference surface (550) and the rivets (210) slide in the elongated holes (220) until the rivets (210) contact the opposite end of the elongated holes (220). This is the measurement position for a push measurement. The linear graduations on the tape (105) are then compared to the push calibration band (525). If the six inch mark (521) on the tape measure falls within the push measurement band (525), the tape measure is correctly calibrated for a push measurement of six inches. In this case, the six inch mark (521) of the tape measure does fall within the push calibration band (525) and consequently is accurate to the desired tolerance. The tape measure (100) passes both the push and the pull calibration test and can be certified as accurate for this measurement in making both push and pull measurements. This indicates that the hook and rivets are properly configured and have not been damaged by handling.

FIG. 7 is a diagram showing the location and dimensions of the slot (515), push band (525), and pull band (520) in the body (506) of the tape measure calibrator. The distance d is the nominal calibration distance. In the example above, the nominal calibration distance was 6 inches. The centerline (700) of the push band is shown by the dash-dot line passing through the center of the push band. This centerline (700) is nominally separated from the push reference surface (515) by the distance d. Similarly, the centerline (705) of the pull band is nominally separated from the pull reference surface (545) by the distance d. The distance d can be any length. For example, when calibrating a metric measuring tape, a metric distance, such as 10 centimeters could be chosen. For users which regularly make specific distance measurements, the distance d could be chosen to ensure that those measurements are within a specified tolerance. For example, if a user consistently makes measurements between 16 and 24 inches, the distance d could be selected as 20 inches. Alternatively, additional push and pull bands could be made on the body at a second calibration distance.

The width of the slot is w. Consequently, the push reference surface (515) and the pull reference surface (545), which are the walls of the slot, are separated by w. Because the distance between the push reference surface/push band and the pull reference surface/pull band is identical, the distance between the centerlines of the push and pull bands is also w.

The tolerance t dictates the width of the push and pull bands. The tolerance t is selectable by the user. For example, the user may select ±1/32 of an inch as the tolerance t. Thus, accuracy of measurements made with the tape measure is acceptable if they are within ±1/32 of an inch of the nominal value. Consequently, the bands (520, 525) extend a distance t on either side of their respective centerlines and have a width of 2t. If the mark on the tape measure associated with the distance d falls within the bands during the push and pull calibrations, the tape measure can be considered acceptable and assumed to make measurements within the desired tolerance. However, if the mark on the tape measure associated with the distance d falls outside either of bands during the push and pull calibrations, the tape measure can be considered defective and appropriate corrective action can be taken. This corrective action may be repairing tape measure by adjusting the end hook, discarding the tape measure, or designating the tape measure for use in non-critical applications only. For example, where substantial wear has changed the fit of the rivets in the elongated holes in the tang body, adjustment of the hook geometry will be ineffective in achieving valid measurements. Thus the tape measure cannot be easily repaired and should be discarded or designated for use in non-critical application.

Lines A, B, C and D define the boundaries of the push and pull bands. Using the push reference surface as a datum, the location of the lines A, B, C and D equal:

Location of A=d−t
Location of B=d+t
Location of C=w+d−t
Location of D=w+d+t

The examples given above are only illustrative. Further, the distances w, d, and t are only nominal distances. The actual manufacturing accuracy used in making the tape measure calibrator will dictate a range of deviation from the nominal values. For example, the width w may have a tolerance of ±0.002 inches, the distance d may have a tolerance ±0.005 inches, and the distance t may have a tolerance of ±0.002 inches. Thus, the locations of the lines A, B, C, and D will not necessarily be exact. However, the error or uncertainty in the position of lines A, B, C, and D can be quantified. For example, if the error in the position of line A is 0.002 inches, and the desired tolerance t is 0.03125 inches, the error in the position of line A is an order of magnitude smaller than the tolerance t. Further, the error of 0.002 inches is significantly smaller than the width of the lines on the measuring tape and may not be visible to or negatively influence a user.

The push band (525) and pull band (520) may be made in a variety of ways. For example, a laser may be used to mark the body (506) at the desired locations. Alternatively, cuts may be made in the upper surface of the body (506) and filled with an inlay to form the bands. In another example, the bands could be formed using an additive process where colored material is deposited over the surface of the body (506) or the bands could be formed during molding of the tape measure calibrator. A variety of other techniques could also be used to form the bands in the desired locations and at the desired tolerances.

Figure 8:
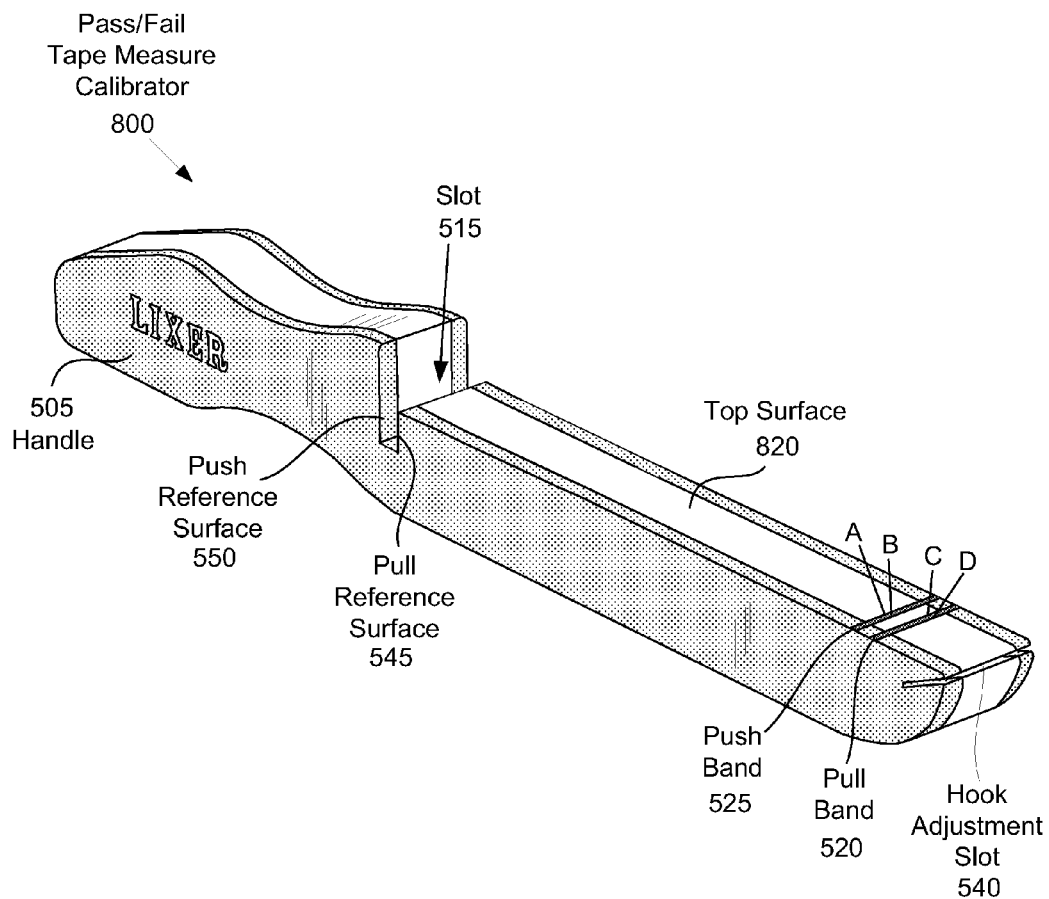
FIG. 8 is a perspective view of an illustrative pass/fail tape measure calibrator, according to one embodiment of principles described herein.

FIG. 8 is a perspective view of an illustrative pass/fail tape measure calibrator (800). According to one illustrative embodiment, the pass/fail tape measure calibrator (800) includes a handle (505) and a slot (515) which forms the first calibration surface (545) and a push reference surface (550). On a top surface (820) there are a number of calibration lines (A, B, C, D) which define the limits of the pull band (520) and push band (525).

The tape measure calibrator may also include an adjustment slot (540) for adjusting the hook geometry. The hook portion (200) of the tape measure end hook (125) is inserted into the hook adjustment slot (540). The precision tape calibrator (500) is held in one hand, while the other hand grasps the tang (205) and flexible tape (105). The hook geometry is then adjusted by applying pressure to the tang (205) and flexible tape (105) such that the angle of the all or part of the hook (200) is changed. The particular direction and amount of adjustment can be guided by a visual inspection of the end hook (125), a measurement of the hook geometry, or the result of a calibration. Following the adjustment of the end hook (125), the calibration procedure described above with respect to FIG. 5 could be repeated to ascertain if the desired result was achieved. However, in some instances the hook adjustment slot (540) may not be included in the tape measure calibrator because the user has decided to discard tape measures that fail the calibration test rather than attempt to repair them.

The pass/fail tape measure calibrator may include a number of additional features which are not shown in this embodiment. For example, the tape measure calibrator may include a spirit level, a laser, a pencil sharpener, leveling feet or other devices which assist the user. Although only two calibration bands are shown, additional calibration bands could be included at various distances from the slot. This would allow calibration of the tape measure at different distances.

Figure 9:
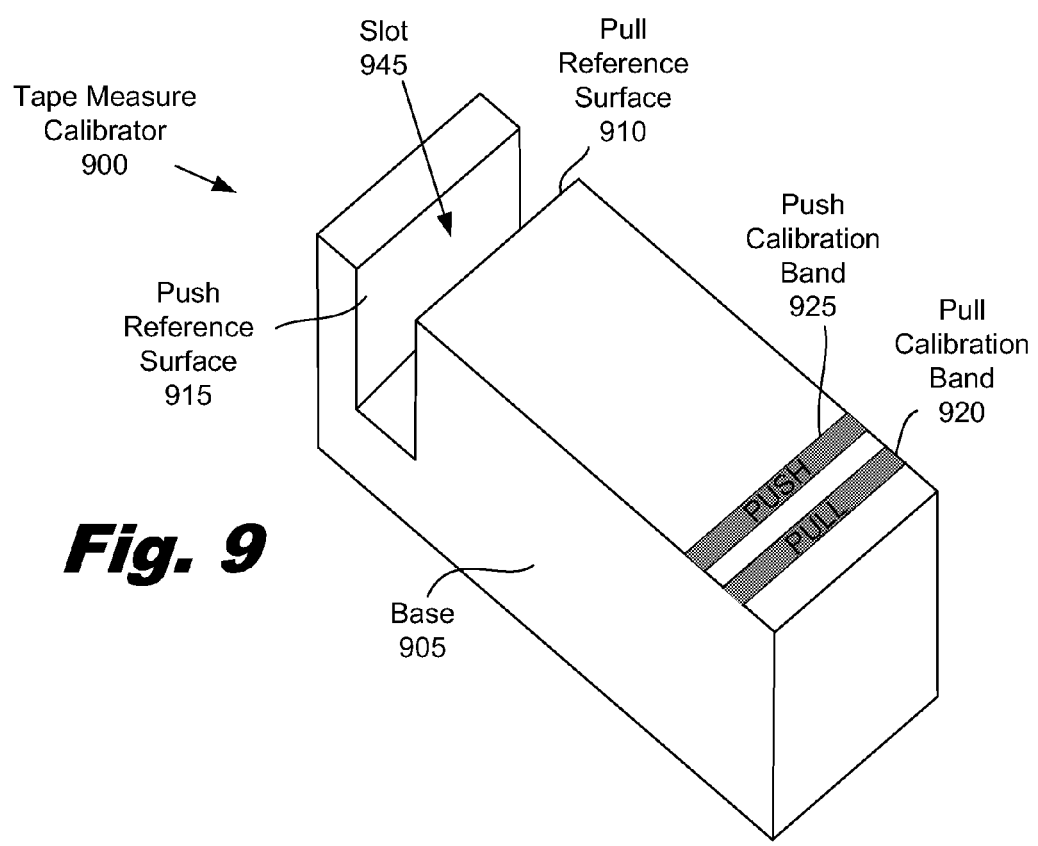
FIG. 9 is a perspective view of an illustrative pass/fail tape measure calibrator, according to one embodiment of principles described herein.

FIG. 9 is a perspective view of a simplified pass/fail measuring tape calibrator (900). According to one illustrative embodiment, the measuring tape calibrator (900) includes a base (905) with a slot (945). The push calibration band (925) and pull calibration band (920) are formed on the upper side of the base (905). As discussed above, the distance between the centerlines of the push calibration band (925) and the pull calibration band (920) is substantially the same as the distance between the pull reference surface (910) and the push reference surface (915). The distance from the push reference surface (915) to the push calibration band (925) is substantially the same as the distance from the first reference surface (910) to the pull calibration band (920).

The bands may be labeled, colored or textured to make them visually distinctive portions of the upper surface. In this example, the bands are labeled "PUSH" and "PULL" and have a different color than the rest of the upper surface. In some embodiments, the push band (925) and the pull band (920) may have different colors. The color of the bands can be selected so that the linear graduations on the tape measure contrast with the bands.

The measuring tape calibrator (500, 800, 900) may be made from a variety of materials. According to one illustrative embodiment, the tape measure calibrator may be made from materials which have relatively high dimensional stability. For example, the base may be made from a nickel steel alloy, such as INVAR. One characteristic of INVAR is that it has a very low coefficient of thermal expansion. Consequently, a measuring tape calibrator made from INVAR may exhibit smaller changes in size as a result of temperature changes. Additionally, it may be desirable for the measuring tape calibrator to be made from a material which is substantially similar to the materials which make up the tape measure. For example, the graduated tape and measuring tape calibrator may be made from spring steel. The tape measure calibrator may also be a composite of several materials. By way of example and not limitation, the tape measure calibrator may be made from several pieces of wood which are laminated together.

A variety of techniques can be used to increase the accuracy and ease of use of a tape measure calibrator. By way of example and not limitation, when an edge forms a calibration mark, the edge may be left sharp rather than beveled. This can assist the user in making comparing the linear graduations on the tape measure by presenting a single, high contrast line. Additionally, various portions of the measuring tape calibrator can be marked or painted to insure accurate identification of various reference surfaces and calibration marks.

Figure 10:
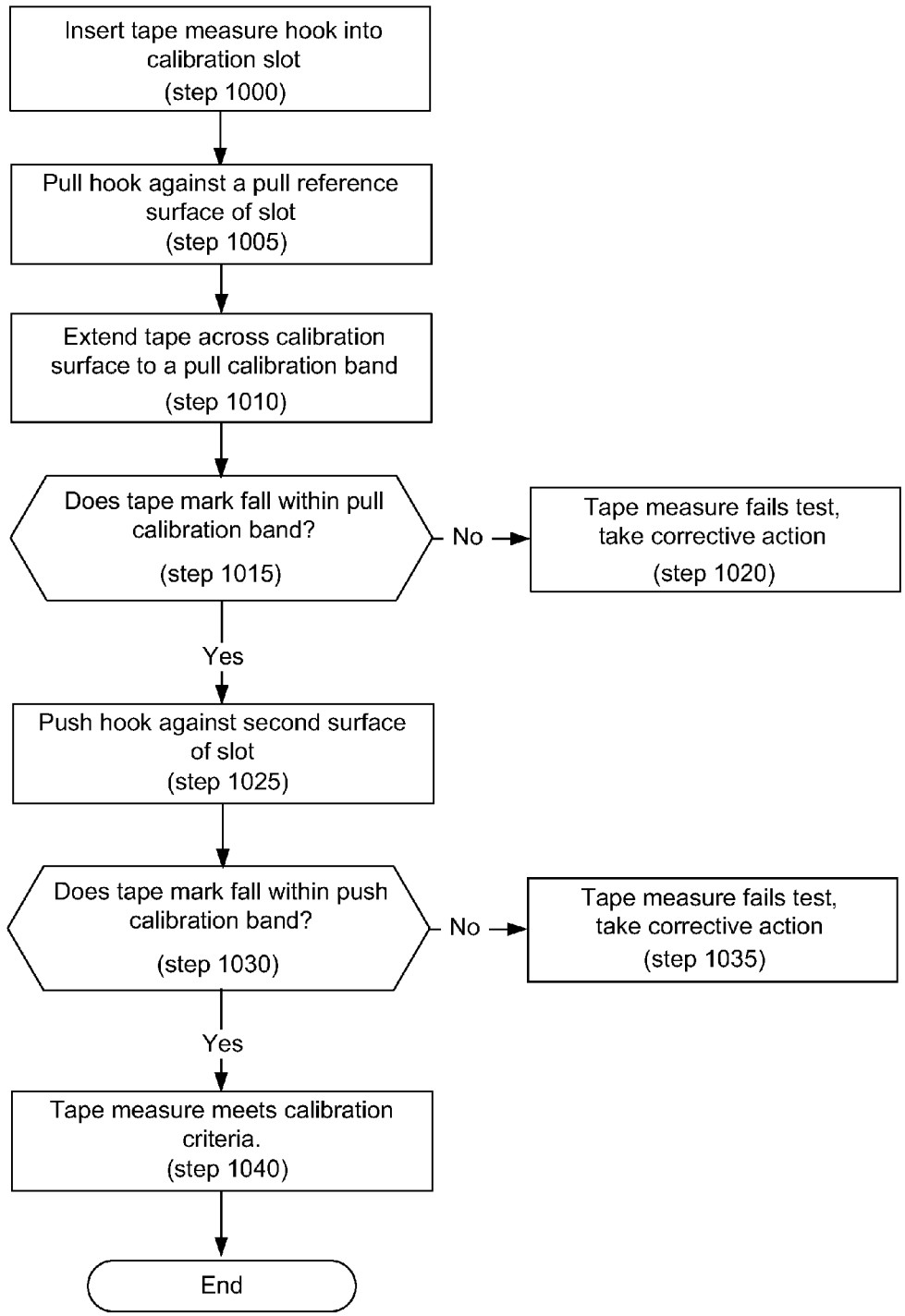
FIG. 10 is a flow chart of an illustrative method for using a pass/fail tape measure calibrator to calibrate a tape measure, according to one embodiment of principles described herein.

FIG. 10 is a flow chart of an illustrative method for using a pass/fail tape measure calibrator to calibrate a tape measure. According to one illustrative embodiment, the tape measure hook is inserted into the calibration slot in the pass/fail tape measure calibrator (step 1000). The hook is then pulled against the pull reference surface of the slot (step 1005). The tape is then extended across a calibration surface to a pull calibration band (step 1010). A determination is made if the tape mark falls within the pull calibration band (step 1015). If the tape mark does not fall within the pull calibration band, the tape measure fails the test and corrective action should be taken (step 1020). For example, the corrective action may include discarding the tape measure, removing the tape measure calibration sticker, and/or replacing the tape measure. If the tape mark falls within the pull calibration band, the tape measure passes the pull calibration test and the push calibration test is performed.

The hook is pushed against a push reference surface of the slot (step 1025). The push measurement error, if any, is measured between a push calibration mark and a corresponding tape mark (step 1025). If the tape mark does not fall within the push calibration band, the tape measure fails the test and corrective action should be taken (step 1035). If the tape mark falls within the push calibration band, the tape measure passes the push calibration test. If the tape measure passes both the pull and push calibration tests, the tape measure meets the calibration criteria (step 1040).

The steps described above are only one example and can be changed in a variety of ways. Steps may be combined, eliminated, reordered or added to the method. For example, the order of the pull calibration and push calibration tests may be reversed. In other embodiments, both tests may be performed prior to taking any corrective action.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A tape measure calibrator comprising:
   a base, the base comprising a slot with a pull reference surface and a push reference surface, the slot being configured to receive an end hook of a tape measure;
   a pull calibration band on the base, a centerline of the pull calibration band indicating a first distance from the pull reference surface; and
   a push calibration band on the base, a centerline of the push calibration band indicating a second distance from the push reference surface;
   in which the first distance and the second distance are substantially equal.

2. The calibrator of claim 1, in which widths of the pull calibration band and the push calibration band are substantially equal, the widths being substantially two times a predefined tolerance distance.

3. The calibrator of claim 2, in which the widths of the pull calibration band and the push calibration band extend one tolerance distance to either side of the centerlines.

4. The calibrator of claim 1, in which the slot is formed in an upper surface of the base, the sides of the slot defining the pull reference surface and the push reference surface, the slot having a width.

5. The calibrator of claim 4, in which the centerline of the push calibration band and the centerline of the pull calibration band are separated by a distance substantially equal to the width of the slot.

6. The calibrator of claim 4, in which the pull calibration band and push calibration band comprise visually distinct regions the upper surface of the base.

7. The calibrator of claim 4, in which the push calibration band is defined by a first boundary line "A" and a second boundary line "B", and the push calibration band is defined by a third boundary line "C" and a fourth boundary line "D", in which the push reference surface is a measurement datum and the distance from the push reference surface to the respective lines is given by:
Location of A=d−t
Location of B=d+t
Location of C=w+d−t
Location of D=w+d+t
Where d=a nominal measurement distance, t=a tolerance, and w=the width of the slot.

8. The calibrator of claim 4, in which the pull calibration band and the push calibration band are visually distinctive regions formed on the upper surface of the base.

9. An apparatus for calibrating a tape measure comprising:
a base,
a slot formed in the base, the slot having a push reference surface and a pull reference surface and being configured to receive a hook of a tape measure; the hook being pulled against the first reference surface during a pull measurement and the hook being pressed against the second reference surface during a push measurement;
a pull calibration band, a centerline of the pull calibration band indicating a first distance from the pull reference surface, a corresponding mark on the tape measure being compared to the pull reference band to determine if the corresponding mark falls within the pull calibration band when the hook is pulled against the pull reference surface; and
a push calibration band, the push calibration band indicating a second distance from the push reference surface, the corresponding mark on the tape measure being compared to the push calibration band to determine if the corresponding mark falls within the push calibration band when the hook is pushed against the push reference surface;
in which the first distance and the second distance are substantially equal.

10. The apparatus of claim 9, in which widths of the pull calibration band and the push calibration band are substantially equal, the widths being substantially two times a tolerance distance; in which the widths of the pull calibration band and the push calibration band extend one tolerance distance to either side of the centerlines.

11. The apparatus of claim 9, in which a width of the slot is substantially greater than two times the tolerance distance.

12. The apparatus of claim 11, in which the centerline of the push calibration band and the centerline of the pull calibration band are separated by a distance substantially equal to the width of the slot.

13. The apparatus of claim 9, in which the pull calibration band and push calibration band comprise visually distinct regions an upper surface of the base, the bands being formed laser ablation of rectangular portions of the upper surface of the base.

14. The calibrator of claim 9, in which:
the push calibration band is defined by a first boundary line "A" and a second boundary line "B", a first visually distinct region extending between the first boundary line "A" and the second boundary line "B"; and
the push calibration band is defined by a third boundary line "C" and a fourth boundary line "D", a second visually distinct region extending between the first boundary line "C" and the second boundary line "D";
in which the push reference surface is a measurement datum and the distance from the push reference surface to the respective lines is given by:
Location of A=d−t
Location of B=d+t
Location of C=w+d−t
Location of D=w+d+t
Where d=a nominal measurement distance, t=a tolerance, and w=the width of the slot.

15. A method for calibrating a tape measure comprising:
placing a hook in a slot, the hook being slidably attached to a flexible tape of the tape measure, the slot comprising a pull reference surface;
pulling the flexible tape to bring the hook into contact with the first reference surface, thereby sliding the end hook to full extension with respect to the flexible tape;
comparing a linear graduation on the flexible tape to a pull calibration band to determine if the linear graduation falls within the pull calibration band; if the linear graduation falls within the pull calibration band, the tape measure's pull measurement is within a predetermined tolerance, if the linear graduation does not fall within the pull calibration band, then the tape measure's pull measurement is not within a predetermined tolerance and corrective action is taken.

16. The method of claim 15, further comprising
placing the hook in the slot, the slot comprising a push reference surface opposing the pull reference surface;
pushing the flexible tape to bring the hook into contact with the push reference surface, thereby sliding the end hook to full retraction with respect to the flexible tape;
comparing a linear graduation on the flexible tape to a push calibration band to determine if the linear graduation falls within the push calibration band; if the linear graduation falls within the push calibration band, the tape measure's push measurement is within a predetermined tolerance, if the linear graduation does not fall within the push calibration band, then the tape measure's push measurement is not within a predetermined tolerance and corrective action is taken.

17. The method of claim 16, in which the corrective action comprises:
making adjustments to the hook; and
recalibrating the tape measure to determine if the linear graduation now falls within the pull calibration band when the hook is pulled against the pull reference surface and the linear graduation falls within the push calibration band when the hook is pushed against the push reference surface.

18. The method of claim 16, in which if the linear graduation falls within the pull calibration band when the hook is pulled against the pull reference surface and the linear graduation falls within the push calibration band when the hook is pushed against the push reference surface, then certifying the measuring tape as meeting a calibration standard.

* * * * *